Patented Feb. 12, 1952

2,585,091

UNITED STATES PATENT OFFICE 2,585,091

SIDE CHAIN HALOGENATION OF ALKYL THIOPHENES

John T. Clarke, Columbus, Ohio, assignor to The Texas Company, New York, N. Y., a corporation of Delaware No Drawing. Application November 14, 1947, Serial No. 786,139

6 Claims. (Cl. 260—332.5)

This invention relates to the halogenation of alkyl derivatives of thiophene. More particularly, it relates to a method of halogenating alkyl thiophene compounds so that predominantly side chain halogenation is effected.

Halogenation of alkyl thiophene compounds by heretofore known procedures has preferentially resulted almost exclusively in nuclear halogenated thiophene derivatives. Prior art methods of halogenating thiophene are summarized in Steinkopf "Die Chemie des Thiophenes," wherein it is stated on page 45 that thiophene homologs are only halogenated in the side chain after the nucleus is fully halogenated as contrasted with the homologs of benzene in which nuclear halogenation is obtained in the cold with a catalyst and side chain halogenation takes place in sunlight with heating. Steinkopf further states that side chain halogenated derivatives of thiophene are prepared by reacting thiophene homologs containing hydroxyl-substituted alkyl groups with hydrogen chloride or hydrogen bromide. Contrary to the experiences of previous investigators, I have discovered that alkyl thiophene compounds can be halogenated to form mono-halo derivatives in which the side chain isomer predominates. Employing the method and conditions specified in this reaction, it is possible to chlorinate a thiophene homolog and obtain a mono-halogenated fraction comprising more than 70 per cent side chain substituted isomer.

In a co-pending application, Serial No. 692,387, of Lawrence W. Devaney, entitled "Nuclear Halogenation of Thiophene," filed August 22, 1946, now U. S. Patent No. 2,533,098, issued Dec. 5, 1950, there is described a continuous method of effecting nuclear hologenation of thiophene compounds which contain at least one reactive nuclear hydrogen atom. As contrasted with the copending application, the present invention is concerned with means whereby nuclear halogenation of alkyl thiophene homologs is minimized and side chain halogenation of thiophene homologs is promoted.

In accordance with this invention, halogenation of alkyl derivatives of thiophene is controlled so that the product comprises predominantly side chain halogenated compounds rather than nuclear halogenated derivatives by reacting an alkyl thiophene compound with halogen at an elevated temperature over about 450 and preferably in the range of 550 to 750° F. The reaction can be conducted in the presence or absence of a diluent such as carbon tetrachloride.

The process of the invention is especially adapted to the production of side chain monohalogenated thiophene derivatives. It is possible to produce predominantly mono-halogenated thiophene derivatives by mixing thiophene homologs and halogen in a thorough and efficient manner at reaction temperature. Means for effecting such rapid and thorough mixing whereby monohalogen derivatives predominate in the product will be described hereafter. In general, any of the well-known means for effecting instantaneous and thorough mixing of gaseous reactants may be employed.

Alkyl thiophene compounds which may be halogenated in the side chain in accordance with the method of this invention include mono-, di-, triand tetra-alkyl thiophene derivatives, but monoalkyl thiophene compounds are the preferred charge stock. Alkyl thiophene compounds containing other radicals such as a nitro group or a hydroxy group on the thiophene nucleus may also be used as the organic reactant. The organic reactant may also be alkyl thiophene derivatives in which the alkyl groups contain substituents such as a hydroxyl group, a sulphonic acid group, or a nitro group. In general, any alkyl derivative of thiophene containing a reactive replaceable hydrogen atom in the alkyl side chain may be employed.

Both chlorine and bromine can be used in the process; however, chlorine is more reactive so that chlorination allows the use of higher throughput rates than bromination while still producing equivalent quantities of the side chain halo derivatives. In general, the use of bromine as the halogen reactant will necessitate slower feed rates and a higher mol ratio of alkyl thiophene to halogen than the corresponding chlorination reaction. Equimolecular mixtures of chlorine and bromine may also be employed to produce mainly bromine, side chain substituted product.

The process may be conducted in any suitable reactor which can withstand the corrosive action of chlorine or bromine and their respective hydrohalides at elevated temperatures above 500° F. Thus, the reactor may be fabricated either of glass or a non-corrosive metal such as stainless steel. The shape of the reactor is not important but as a matter of convenience and efficiency of reaction, a cylindrical reactor is desirable. Since a light source is not required to effect side chain halogenation of thiophene homologs, no limitation is placed upon the type of reactor that may be employed.

In order to direct the halogenation of alkyl thiophene derivatives towards the production of predominantly side chain halogenated derivatives, it is necessary to maintain the reaction temperature above about 450° F., but optimum results are obtained between about 550° F. and 750° F. It will be understood that the optimum temperature for side chain halogenation will vary with the alkyl thiophene derivative and with the halogenating agent that are employed as reactants. In general, however, substantial side chain halogenation takes place above about 550° F. and in the case of chlorine, optimum yields of side chain chlorinated product as measured by the ratio of side chain chlorinated isomer to nuclear chlorinated isomer are obtained between 600° F. and 700° F.

In the chlorination of a mono-alkyl derivative such as methyl thiophene and tertiary butyl thiophene, it has been found that the mol ratio of hydrocarbon to chlorine should be maintained between 1.0 and 5.0 with optimum results being obtained at a mol ratio of about 2.0 to 3.0. Higher mol ratios may, of course, be employed but these would merely necessitate the fractionation of large quantities of product containing unreacted alkyl thiophene in order to recover the desired side chain chlorinated derivatives. With bromine, higher mol ratios, e. g., of the order of 3 to 5, are advantageously employed.

Side chain halogenation of alkyl thiophene compounds is generally effected at atmospheric pressure. However, pressures ranging from atmospheric to about 250 pounds per square inch and more may be employed. As a general proposition, variation in pressure seems to have little directive influence on the course of high temperature halogenation of alkyl thiophene compounds.

Side chain halogenation of alkyl thiophene compounds is effected at a space velocity of at least 50 volumes of liquid alkyl thiophene derivative per hour per volume of reactor space. Hereafter, whenever space velocities are used, the values will be based on a volume of liquid thiophene derivative per hour per volume of reactor space. Space velocities of between about 50 and 200 can be employed in the halogenation but space velocities of 60 to 150 are preferred. When chlorine is used, space velocities between about 70 and 120 are generally employed. As a general proposition, space velocities should be maintained above a minimum of about 50 in order to prevent burning of the reaction mixture.

As heretofore mentioned, the side chain halogenation of alkyl thiophene derivatives can be effected in the presence or absence of diluents. Carbon tetrachloride is the most widely used diluent but other compounds such as hexachloroethane which are inert under reaction conditions may also be used. The halogen charge may also be diluted with inert gases such as nitrogen.

In carrying out the reaction in accordance with the method of this invention, the alkyl thiophene derivative is preheated to approximately reaction temperature, i. e., about 450° F. to 750° F. prior to mixing with halogen. It is necessary to preheat the alkyl thiophene compound to reaction temperature prior to mixing because otherwise nuclear halogenation would take place during the period wherein the mixture of hydrocarbon and halogen is raised to reaction temperature. It is advisable to effect rapid and thorough mixing of the alkyl thiophene with the halogen in order to obtain high yields of monohalogenated product and reduce the yield of poly-halogenated derivatives. Apparently, if inefficient mixing is effected, there occurs polyhalogenation of the alkyl thiophene molecules which are surrounded by a dense concentration of halogen.

There are many methods of effecting rapid and thorough mixing of the reactants; one of these methods which has been found most effective is to employ an aspirating principle wherein the halogen is introduced through a small orifice into the alkyl thiophene stream at a point where the alkyl thiophene is passed through a constriction in the conduit leading to the reaction vessel; rapid and efficient mixing is effected in the constriction as a result of the turbulence caused by the high velocity of the thiophene compound passing therethrough. Other well-known means of rapid and efficient mixing of gases such as an annular atomizer type mixer may also be employed.

The halogenated compounds produced by the reaction may be recovered from reaction products in accordance with conventional methods of recovery. For example, the reaction products of a typical chlorination containing unreacted alkyl thiophene, hydrogen, hydrogen chloride, cracked products of charge stock, and chlorinated alkyl thiophene derivatives may be cooled so as to condense normally liquid products. The condensed liquid products can then be treated with solid sodium bicarbonate to neutralize any dissolved hydrochloric acid and then fractionated at reduced pressure into fractions comprising the different chloro isomers. Each fraction is thereafter subjected to a series of tests whereby it is characterized as a nuclear substituted or side chain substituted derivative and as a mono- or poly-halogenated compound.

In order that the invention may be more fully understood, reference is now made to the following specific examples to illustrate the preferred embodiment of the invention; in all the subsequent examples the reactants were mixed by means of an aspirator mixer as described in the previous paragraph.

In the subsequent examples, tertiary butyl thiophene and methyl thiophene are chlorinated over a temperature range from about 400 to 700° F. The means whereby the side chain and nuclear substitute mono-isomers were differentiated from one another are summarized as follows:

The nuclear and side chain chlorinated derivatives of methyl thiophene were differentiated by means of aqueous silver nitrate; chlorine attached to the nucleus is stable to aqueous silver nitrate, while chlorine, which is substituted in the side chain is removed quantitatively by means of aqueous silver nitrate. Further, the nuclear chlorinated derivative of methyl thiophene had a boiling point of 126° F. at 20 millimeters, while the side chain-chlorinated derivative had a boiling point of 167° F. at 20 millimeters; the literature values of the boiling point of these compounds are respectively 309° F. at 738 millimeters for the nuclear derivative and 347° F. at 760 millimeters for the side chain derivative. These two properties, namely, reactivity to aqueous silver nitrate and boiling point were sufficient to differentiate the nuclear and side chain mono-chloro isomers of methyl thiophene.

Literature values were not available for the nuclear and side chain chlorinated derivatives of tertiary butyl thiophene so that it was necessary to prepare these compounds in pure form by various methods. The nuclear derivative, namely 5-chloro-2-tertiary butyl thiophene, was prepared by two methods: first, 2-chloro-thiophene was alkylated with isobutylene; second, 2-tertiary butyl thiophene was chlorinated at room temperature in accordance with the method described in the previously mentioned co-pending application, Serial No. 692,387. 5-chloro-2-tertiary butyl thiophene prepared by these methods has a boiling point of 398° F. at atmospheric pressure and a refractive index, $n_D^{20}$, of 1.514.

The side chain chlorinated derivative, 2(1,1-dimethyl - 2 - chloro-ethyl) thiophene commonly called chloro-tertiary butyl thiophene, was prepared by the alkylation of thiophene with methallylchloride. The boiling point of this compound at 10 millimeters is 190° F. (the estimated boiling point at atmospheric pressure was 410° F.); the refractive index of chloro-tertiary butyl thiophene is 1.535.

Example I 2-tertiary butyl thiophene was separately preheated to about 400° F. Immediately thereafter, chlorine gas was continuously introduced into the hot alkyl thiophene vapor in a manner so as to effect rapid and thorough mixing of the reactants. The reactants in a mol ratio of about 2.7 mols of tertiary butyl thiophene per mol of chlorine were introduced, at a space velocity of 74 liquid volumes of alkyl thiophene per hour per volume of reactor space, into an unpacked glass reaction zone in which the average temperature was 400° F. After about an hour on stream, 270 grams of tertiary butyl thiophene and 52 grams of chlorine had been charged to the reactor. A yield of 145.9 grams of mono-chloroderivative of t-butyl thiophene was obtained which is a 59 mol per cent yield based on the chlorine charged. The mono-chlorinated derivative consisted entirely of 5-chloro-2-tertiary butyl thiophene, so that the ratio of side chain mono-chlorinated product to nuclear mono-chlorinated product was 0.

Example II 2-tertiary butyl thiophene was separately preheated to about 570° F. Immediately thereafter chlorine gas was continuously introduced into the hot alkyl thiophene vapor in a manner so as to effect rapid and thorough mixing of the reactants. The reactants in a mol ratio of about 2.27 mols of tertiary butyl thiophene per mol of chlorine were introduced into an unpacked glass reaction zone at a space velocity of 81.3 liquid volumes of alkyl thiophene per hour per volume of reactor space. After about one hour on stream, about 309 grams of tertiary butyl thiophene and 69 grams of chlorine had been charged to the reactor. 196.8 grams of mono-chlorinated tertiary butyl thiophene was obtained which is a 60 mol per cent yield based on the chlorine charged. The mono-chlorinated derivative comprised 170.5 grams of 5-chloro-2-tertiary butyl thiophene and 26.3 grams of chloro-tertiary butyl thiophene so that the ratio of side chain mono-chlorinated product to nuclear mono-chlorinated product was 0.16.

Example III 2-tertiary butyl thiophene was separately preheated to about 645° F. Immediately thereafter chlorine gas was continuously introduced into the hot alkyl thiophene vapor in a manner so as to effect rapid and thorough mixing of the reactants. The reactants in a mol ratio of about 2.06 mols of tertiary butyl thiophene per mol of chlorine were introduced into an unpacked glass reaction zone in which the average temperature was about 645° F. at a space velocity of 77.3 liquid volumes of alkyl thiophene per hour per volume of reactor space. After about 25 minutes on stream, 114 grams of tertiary butyl thiophene and 28 grams of chlorine had been charged to the reactor. A yield of 73.2 grams of mono-chlorinated tertiary butyl thiophene was obtained, which is a 55 mol per cent yield based on the chlorine charged. The mono-chlorinated derivative contained 18.6 grams of 5-chloro-2-tertiary butyl thiophene and 54.6 grams of chloro-tertiary butyl thiophene so that the ratio of side chain mono-chlorinated product to nuclear mono-chlorinated product was 2.9.

Example IV 2-tertiary butyl thiophene was separately preheated to about 655° F.; immediately thereafter chlorine gas was continuously introduced into the hot alkyl thiophene vapor in a manner so as to effect rapid and thorough mixing of the reactants. The reactants in a mol ratio of about 2.2 mols of tertiary butyl thiophene per mol of chlorine were introduced into an unpacked reaction zone in which the average temperature was about 655° F. at a space velocity of 79.8 liquid volumes of alkyl thiophene per hour per volume of reactor space. After about 55 minutes on stream, 276 grams of tertiary butyl thiophene and 63 grams of chlorine had been charged to the reactor. A yield of 189.1 grams of mono-chlorinated tertiary butyl thiophene was obtained which is a 63 mol per cent yield based on the chlorine charged. The mono-chlorinated derivative consisted of 63 grams of 5-chloro-2-tertiary butyl thiophene and 126 grams of chloro-tertiary butyl thiophene so that the ratio of side chain mono-chlorinated product to nuclear mono-chlorinated product was 2.0.

Example V 2-methyl thiophene was separately preheated to about 466° F.; immediately thereafter chlorine gas was continuously introduced into the hot alkyl thiophene vapor in a manner so as to effect rapid and thorough mixing of the reactants. The reactants in the mol ratio of about 4.5 mols of methyl thiophene per mol of chlorine were introduced at a space velocity of 119.5 liquid volumes of alkyl thiophene per hour per volume of reactor space into an unpacked glass reaction zone in which the average temperature was about 466° F. After about two hours on stream, 487 grams of methyl thiophene and 79 grams of chlorine had been charged to the reactor. A yield of 56.8 grams of mono-chlorinated methyl thiophene was obtained which is a 53.3 mol per cent yield based on the chlorine charged. The mono-chloro-derivative consisted of 114.3 grams of 5-chloro-2-methyl thiophene and 42.1 grams of chloro-methyl thiophene (thenyl chloride) so that the ratio of side chain mono-chlorinated product to nuclear mono-chlorinated product was 0.37.

Example VI 2-methyl thiophene was separately preheated to about 610° F. Immediately thereafter chlorine gas was continuously introduced into the hot alkyl thiophene vapor in a manner so as to effect rapid and thorough mixing of the reactants. The reactants in a mol ratio of 4.37 mols of methyl thiophene per mol of chlorine were introduced at a space velocity of 119 liquid volumes of alkyl thiophene per hour per volume of reactor space into an unpacked glass reaction zone in which the average temperature was 610° F. After about an hour on stream, 366 grams of methyl thiophene and 58 grams of chlorine had been charged to the reactor. A yield of 104 grams of mono-chlorinated methyl thiophene was obtained which is a 49 mol per cent yield based on the chlorine charged. The mono-chlorinated derivative consisted of 36.4 grams of 5-chloro-2-methyl thiophene and 67.2 grams of chloro-methyl thiophene (thenyl chloride) so that the ratio of side chain mono-chlorinated product to nuclear mono-chlorinated product was 1.85.

It will be understood of course that bromination of alkyl thiophene compounds is effected in a manner similar to the chlorination procedure which has been described in the preceding examples. In general, higher molecular ratios of alkyl thiophene to halogen and lower space velocities are employed during bromination than are used during chlorination of thiophene homologs.

Furthermore, alkyl thiophene compounds other than methyl thiophene and tertiary butyl thiophene are halogenated in the side chain by the technique heretofore described. It will also be understood that nuclear or side chain substituted alkyl thiophene compounds which may be volatilized under the conditions of reaction can be employed as a charge stock; the only requisite is that there be a replaceable hydrogen atom in the alkyl group.

In the procedures heretofore described, monohalogenated isomers have predominated in the reaction product; it is possible to obtain a product comprising mainly poly-halogenated side chain substituted derivatives by decreasing the mol ratio of alkyl thiophene to halogen and by the further addition with thorough mixing of an additional quantity of halogen.

Obviously, many modifications and variations of the invention, as hereinbefore set forth, may be made without departing from the spirit and scope thereof and, therefore, only such limitations should be imposed as are indicated in the appended claims.

I claim:

1. In the halogenation of alkyl thiophene compounds, the method of preferentially effecting substitution of the side chain which comprises reacting an alkyl thiophene compound with halogen at a temperature between about 450 and 750° F. and at a space velocity of at least 50 volumes of alkyl thiophene per hour per volume of reactor space.

2. In the halogenation of alkyl thiophene compounds, the method of preparing mainly monohalogenated side chain derivatives which comprises reacting an alkylthiophene compound with halogen at a temperature between about 500 and 750° F. at a space velocity between 50 and 200 volumes of alkyl thiophene per hour per volume of reactor space and at a mol ratio of alkyl thiophene to halogen of at least 2.

3. In the halogenation of alkyl thiophene compounds, the method of preferentially effecting substitution in the side chain which comprises introducing an alkyl thiophene and halogen into a reaction zone at a space velocity between about 50 and 200 volumes of alkyl thiophene per hour per volume of the reactor space, effecting reaction between feed alkyl thiophene and halogen at a temperature between about 500 and 750° F., and recovering a side chain substituted halogen derivative from the reaction product.

4. 2(1,1-dimethyl-2-chloro-ethyl) thiophene.

5. In the chlorination of alkyl thiophene compounds a method of preferentially effecting substitution of the side chain which comprises reacting an alkyl thiophene compound with chlorine at a temperature between 450 and 750° F., and at a space velocity of at least 50 volumes of alkyl thiophene per hour per volume of reactor space.

6. A method according to claim 5 in which the chlorination is effected at a space velocity of 70 to 120 volumes of alkyl thiophene per hour per volume of reactor space.

JOHN T. CLARKE.

REFERENCES CITED

The following references are of record in the file of this patent:

UNITED STATES PATENTS

| Number | Name | Date |
|---|---|---|
| 1,428,984 | Schmidlin | Sept. 12, 1922 |
| 2,425,721 | Blicke | Aug. 19, 1947 |

FOREIGN PATENTS

| Number | Country | Date |
|---|---|---|
| 378,866 | Great Britain | Aug. 16, 1932 |

OTHER REFERENCES

Beilstein's Handbuch der Organischen Chemie, ed. 4, vol. 17, page 44, Springer, Berlin, 1933.

Morton: "The Chemistry of Heterocyclic Compounds," p. 42, McGraw-Hill, N. Y., 1946.

Groggins: "Unit Processes in Organic Synthesis," ed. 3, p. 199, McGraw-Hill, N. Y., 1947.

Richter: "Organic Chemistry," pp. 649, 650, Wiley, N. Y., 1938.